(12) United States Patent
Zhang et al.

(10) Patent No.: US 9,898,461 B2
(45) Date of Patent: Feb. 20, 2018

(54) INCORPORATION OF USER-PROVIDED NATURAL LANGUAGE TRANSLATIONS IN A SOCIAL NETWORKING SYSTEM

(71) Applicant: Facebook, Inc., Menlo Park, CA (US)

(72) Inventors: Ying Zhang, Turlock, CA (US); Alexander Waibel, Murrysville, PA (US)

(73) Assignee: Facebook, Inc., Menlo Park, CA (US)

( * ) Notice: Subject to any disclaimer, the term of this patent is extended or adjusted under 35 U.S.C. 154(b) by 397 days.

(21) Appl. No.: 14/567,941

(22) Filed: Dec. 11, 2014

(65) Prior Publication Data

US 2016/0170973 A1    Jun. 16, 2016

(51) Int. Cl.

| | | |
|---|---|---|
| G06F 17/28 | (2006.01) | |
| G06F 17/27 | (2006.01) | |
| G10L 15/04 | (2013.01) | |
| G10L 21/00 | (2013.01) | |
| G06Q 50/00 | (2012.01) | |

(52) U.S. Cl.
CPC ........... *G06F 17/289* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 7,346,487 B2 * | 3/2008 | Li | ....................... | G06F 17/2735 704/10 |
| 8,402,094 B2 | 3/2013 | Bosworth et al. | | |
| 8,886,517 B2 * | 11/2014 | Soricut | ............... | G06F 17/2854 704/2 |
| 9,298,703 B2 * | 3/2016 | Leydon | .............. | G06Q 30/0217 |
| 9,304,990 B2 * | 4/2016 | Bank | ...................... | G06F 17/289 |
| 9,424,597 B2 * | 8/2016 | Chelly | ................... | G06F 17/289 |
| 9,426,110 B2 * | 8/2016 | Aalbers | ................... | H04L 51/12 |
| 9,471,563 B2 * | 10/2016 | Trese | .................. | G06F 17/2836 |
| 2011/0082683 A1 * | 4/2011 | Soricut | ................. | G06F 17/289 704/2 |
| 2012/0166433 A1 | 6/2012 | Tseng et al. | | |
| 2012/0166532 A1 | 6/2012 | Juan et al. | | |
| 2014/0303981 A1 * | 10/2014 | Skiba | .................. | H04M 3/5175 704/270 |
| 2015/0229591 A1 * | 8/2015 | Vigliotti | ................ | H04L 51/046 709/206 |
| 2016/0019882 A1 * | 1/2016 | Matula | ................... | G10L 15/187 704/254 |
| 2016/0124942 A1 * | 5/2016 | Amin | ...................... | G06F 17/27 704/2 |

\* cited by examiner

*Primary Examiner* — Satwant Singh
(74) *Attorney, Agent, or Firm* — Fenwick & West LLP

(57) ABSTRACT

A social networking system determines whether a particular user is qualified to provide translations of text from a first language to a second language. The determination may include evaluation of the language competencies of the user, and also of the trustworthiness of the user as a translator, as determined based on prior translations submitted by the user. The social networking system also selects translations of a text item for a user to whom that text is to be shown. When evaluating a candidate translation for presentation to the user, the evaluation may assess factors such as the determined qualification as a translator of the user who provided the candidate translation; a quality score of the candidate translation itself; and/or the similarity of the user viewing the content and the user providing the candidate translation.

21 Claims, 4 Drawing Sheets

300

Social Network     *Welcome, Cristoforo Re!*

News Feed

| What's on your mind? |

305 {  LBJ   L. James I've taken my talents back to Cleveland to join Uncle Drew. 306

3 hours ago • Comment • Like
• Translate to Italian ~307

 Adam L. Look at this output for the Java program that I just wrote!

3 hours ago • Comment • Like

 Amber Lee Just call me "Ariana"...

5 hours ago • Comment • Like

*Cristoforo Re likes this.*

 Little David Will *I* get to play SSB when I grow up, too?

5 hours ago • Comment • Like

*Amber Lee says: "Yes, it's such fun!"*

*Brenden B. says: "I already dominate Cristoforo at that..."*

Social Network    *Benvenuti, Marcello Scotti!*

News Feed

| De che pensa? |

305 {  LBJ   L. James  Ho preso i miei talenti di nuovo a Cleveland per unirmi con Zio Drew.
            *-Traduzione fornito da Cristoforo Re:* ~308

*3 ore fa* • *Commenta* • *Mi piace*
            •*Buona traduzione?*  ~309

[photo]  Cristoforo Re  Non vedo l'ora di andare a Roma!  :-)

6 ore fa • Commenta • Mi piace

INCORPORATION OF USER-PROVIDED NATURAL LANGUAGE TRANSLATIONS IN A SOCIAL NETWORKING SYSTEM

BACKGROUND

The present invention generally relates to the field of electronic social networking systems, and more particularly, to ways of obtaining and selecting appropriate natural language translations of text within a social networking system.

Social networking systems, such as FACEBOOK®, may have large user bases representing many countries and languages. In many cases, users may not be able to understand the content in which they are interested. For example, an international celebrity may submit status updates or other postings on the social networking system, and many of the users who have subscribed to the postings of the celebrity may not be able to read the postings due to language barriers. Providing an "official" translation for all such postings would constitute too large a burden for the social networking system, and the celebrity will typically not provide translations of the posting for alternate languages.

In such cases, the social networking system could allow other users to provide translations of the postings, but there is a risk that the users might provide faulty translations, whether intentionally or unintentionally. For example, a user might intentionally provide a misleading and/or insulting translation for a statement of a celebrity (or other message poster) that the user dislikes, or the user might simply have a poor grasp of the language in question and thus provide a low-quality translation.

SUMMARY

In embodiments of the invention, a translation module of a social networking system determines whether a particular user is qualified to provide translations from a first language to a second language. The determination may include evaluation of the language competencies of the user as well as evaluation of the trustworthiness of the user as a translator, as determined based on prior translations submitted by the user. In one embodiment, trustworthiness is assessed based on the user's prior translations according to factors such as how well the user's prior translations match those produced by others users and by machine translations; the ratings given by other users to the user's prior translations; and/or whether the user's prior translations contain blacklisted words or phrases.

In one embodiment, a translation selection module of the social networking system selects translations of a text item for presentation to a user. For example, the text item may have been submitted in a first language, but a user interested in that text item may speak a second language and not understand the first language. When evaluating a candidate translation for presentation to the user, the evaluation may assess factors such as the determined qualification as a translator of the user who provided the candidate translation; a quality score of the candidate translation itself; and/or the similarity of the user viewing the content and the user providing the candidate translation.

BRIEF DESCRIPTION OF DRAWINGS

FIGS. 3A and 3B are sample user interfaces respectively illustrating the solicitation of a translation of text by a first user and presentation of the translated text to a second user, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
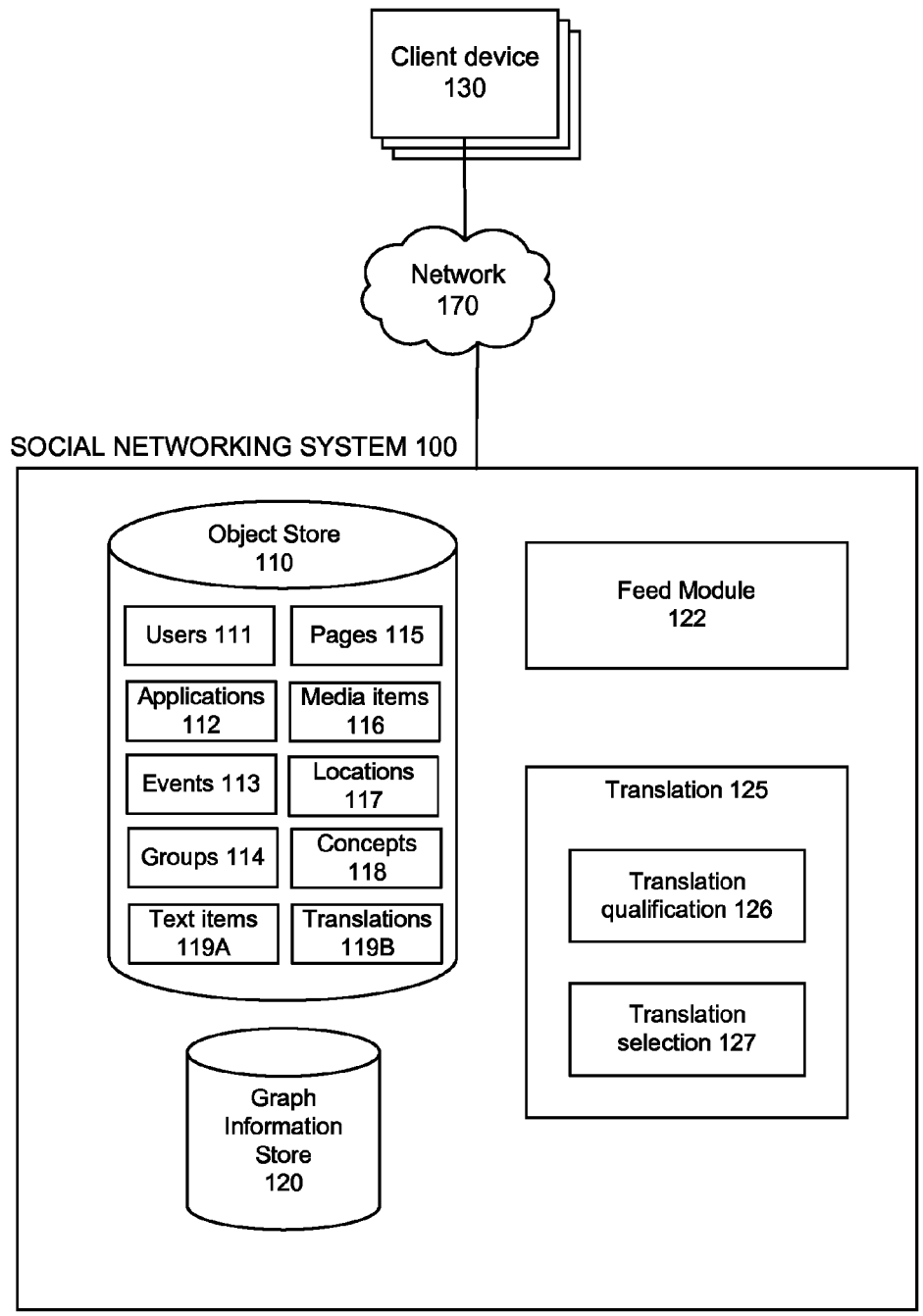
FIG. 1 is a high-level block diagram of a computing environment, according to one embodiment.

FIG. 1 is a high-level block diagram of a computing environment according to one embodiment. FIG. 1 illustrates a social networking system 100 and client devices 130 connected by a network 170. A user of the client device 130 interacts with the social networking system 100 via an application such as a web browser or an application specifically authored to interface with the social networking system, performing operations such as browsing content, posting messages, performing queries for people or other content of interest, and the like.

The social networking system 100 comprises an object store 110 that stores information on various objects tracked by the social networking system 100. These objects may represent a variety of things with which a user may interact in the social networking system 100. For example, the objects may include the user or other users 111 of the social networking system, represented, e.g., as a profile object for the user. The profile includes information about the user, whether expressly stated by the user, or inferred by the social networking system 100 (e.g., based on the user's actions on the social networking system). The objects may also include, without limitation, applications 112 (e.g., a game playable within the social networking system), events 113 (e.g., a concert that users may attend), groups 114 to which users may belong (e.g., a group devoted to alternative energy research), pages 115 (e.g., pages constituting a particular person or organization's presence on the system, such as pages about particular celebrities, car models, or TV shows), items of media content 116 (e.g., pictures, videos, audio, text, or any other type of media content), locations 117 associated with a user (e.g., "San Jose, California, USA"), and concepts 118 or other terms (e.g., an object corresponding to the concept "alternative energy"). An object in the object store 110 may represent an entity existing within the social networking system (e.g., an application 112 available on the social networking system), a virtual entity that exists outside the domain of the social networking system (e.g., a website), or a real-world entity (e.g., a person, a product, or a show). User objects 111 may represent an individual human person, but also may represent other entities, such as fictitious persons or concepts.

The object store 110 may store text items 119A, which are objects having textual portions. For example, the text items 119A include postings submitted by users 111, such as status update messages, inbox messages, comments, notes, postings, or the like. Other objects described above may also be considered text items 119A, such as pages 115 and media items 116, assuming that they contain text. The object store 110 additionally stores translations 119B corresponding to the text items 119A, which are intended as equivalents of the text items in other languages. For example, a particular text item 119A written in English might have a corresponding translation 119B in Italian and in Chinese. In one embodiment, the object store 110 stores the correspondence between text items 119A and their translations 119B, identifiers of the users 111 that submitted the text items and the translations, a language in which the text items and translations are written (e.g., determined automatically by the social networking system 100 using natural language analysis); dates of the submission of the text items and translations; and the like.

The object store 110 may store all of the objects existing within the social networking system 100, such as the code of an application 112, or the image data associated with an image media item 116. Alternatively, for virtual entities existing outside of the social networking system 100, the object store 110 may contain some form of pointer or reference to the entities, such as the uniform resource locator (URL) of an external media item 116. Additionally, the object store 110 may also store metadata associated with the objects, such as a name describing the object (e.g. "L. James" for a person or page 115, or "Green Energy Group" for a group 114), an image representing the object (e.g., a user profile picture), or one or more tags assigned to the object by users (e.g. the textual strings "game", "crime", and "strategy" for a strategy game application). Different types of objects may have different types of metadata, such as a set of associated users 111 for a group 114, a media type (e.g., "video") for a media item object 116, and a unique user ID and name tokens (e.g., separate first and last names "Al" and "Gore") for a user object 111.

In one embodiment the social networking system 100 further comprises a graph information store 120 that represents the objects of the object store 110 as nodes that are linked together in a "social graph." The graph information store 120 thus comprises information about the relationships between or among the objects, represented as the edges connecting the various object nodes. Various examples of edges in the social graph include: an edge between two user objects 111 representing that the users have a relationship in the social networking system (e.g., are friends, or have communicated, viewed the other's profile, expressed a request to see ("follow") the comments/actions of the other user is, or generally interacted in some way), an edge between a user object 111 and an application object 112 representing that the user has used the application, and an edge between a user object 111 and a group object 114 representing that the user belongs to the group, and an edge between a user object 111 and a page object 115 representing that the user has viewed the page, expressly specified an affinity for the page (e.g., "Liked" the page), or requested to "follow" the page. A user 111 is considered a direct connection of another user in the social networking system 100 if there is an edge between the two users in the social graph, as opposed, for example, to there only being a series of edges that indirectly connect the users.

For example, if one user 111 establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge. In a still further example, if a first user follows a second user, the social networking system 100 is notified of this fact, a unidirectional "following" edge may be created between from the first user to the second user within the graph information store 120. Using a social graph, therefore, a social networking system may keep track of many different types of objects and edges (the interactions and connections among those objects), thereby maintaining an extremely rich store of socially relevant information.

In one embodiment, edges in the graph information store 120 have associated metadata, such as a label describing the type of relationship (e.g., "friend" or "following" as the label between two user objects), and/or a value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

The social networking system 100 further comprises a feed module 122 that displays a list of relevant text items 119A or other objects from the social networking system (a "feed") for a given user 111 to view within the user interface for the user's account on the social networking system. For example, the feed can include text items 119A such as status messages of other users 111 of the social networking system 100 (e.g., the user's first-order connections), as well as comments of other users thereto; recent events 113; recent actions of a given application 112; and the like. In one embodiment, the feed module 122 constructs a list of some number N of the most recent content items relevant to the given user, places them within a webpage, and provides the webpage to the client device 130 of the user.

The social network system 100 further comprises a translation module 125 that handles details related to the translation of a text item from one natural language into another. Specifically, the translation module 125 comprises a translation qualification module 126 that determines whether a given user is qualified to translate a given text item from a given first language to a given second language. The translation module 125 further comprises a translation selection module 127 that selects, for a given user and for a given text item, the translation of the text item that is most appropriate for that user.

The translation qualification module 126 determines whether a given user ($U_T$) is qualified to translate a given text item (C) from a given source language ($L_1$) to a given target language ($L_2$). In various embodiments, the translation qualification module 126 makes the determination based on one or more of the following factors:

Language competency: The translation qualification module 126 quantifies a degree of competence that the user $U_T$ would have when translating from the source language $L_1$ to the target language $L_2$. To do so, the translation qualification module 126 identifies the languages in which user $U_T$ is competent. In one embodiment, this determination is made based on one or more of: languages expressly specified in the social networking system profile of user $U_T$; languages in which $U_T$ has previously submitted content (e.g., made postings) on the social networking system; the languages spoken by or used in communications by user $U_T$'s connections on the social networking system; and/or locations associated with user $U_T$, such as $U_T$'s place of birth or current residence. The greater the extent to which $U_T$ is competent in both the source language $L_1$ and the target language $L_2$, the greater the degree of competence of $U_T$ for the translation.

Trustworthiness: The translation qualification module 126 additionally determines whether user $U_T$ may be trusted to provide accurate translations, based on any translations that $U_T$ has previously submitted for other text items. In one embodiment, trustworthiness is evaluated according to the following factors:

(A) Comparisons with machine translations: The translation qualification module 126 performs an automated machine translation of the original text items into the same languages into which $U_T$ translated them then compares the machine translations with the translations provided by $U_T$. The greater the degree of commonality between $U_T$'s translations and the machine translations, the more trustworthy $U_T$ is considered. In one embodiment, the degree of commonality between two translations is computed based on the percentage of words or groupings of words (e.g., phrases or sentences) in common.

(B) Comparisons with translations of other users: In one embodiment, the translation qualification module 126 also compares prior translations by $U_T$ of a text item into a language $L_2$ with translations of other users for that same text item into language $L_2$. The greater the degree of commonality between $U_T$'s translations and the translations of others, the more trustworthy $U_T$ is considered.

(C) Translation ratings by other users: The translation qualification module 126 takes into account any ratings of $U_T$'s translations that other users have provided. The ratings may take different forms in different embodiments, such as binary "Good"/"Bad" or "Flagged as a bad translation"/not flagged ratings, or a rating on a scale (e.g., 1-10). In one embodiment, only the ratings of users that the translation qualification module 126 determines are competent to rate translations (e.g., those that are competent in the language in question) are considered. Thus, the translation qualification module 126 identifies the ratings by other users of $U_T$'s prior translations, and the more positive the ratings, the more trustworthy it considers $U_T$ to be.

(D) Presence of blacklisted words: Some users may provide malicious "translations" of text items of a celebrity or other user that they dislike, e.g., abusively expressing their dislike of the celebrity, rather than providing a legitimate translation. Thus, the translation qualification module 126 determines a degree to which $U_T$'s translations contain terms (i.e., words or phrases) from a list of terms known to indicate that a translation is likely malicious or otherwise flawed, such as profanity, abusive words, or the like. The greater the number or percentage of blacklisted terms within $U_T$'s prior translations, the less trustworthy $U_T$ is considered.

In one embodiment, the translation module 125 gives a user the option to provide a translation of a text item only if the translation qualification module 126 determines that the user is competent. For example, if the user $U_T$ is found to be competent to translate text item C from source language $L_1$ into target language $L_2$, then (and only then) the translation module 125 provides some mechanism allowing or requesting $U_T$ to submit a translation for C, such as a "Translate" link displayed in association with the C. In another embodiment, the translation module 125 permits a user to provide a translation even when the translation qualification module 126 has not determined the user to be competent to do so, and later uses the translation qualification module 126 and/or translation selection module 127 to determine whether to use that translation (e.g., whether to display that translation to another user).

The translation selection module 127 selects, for a given user $U_V$ viewing a given text item C, one or more translations of the text item that are most appropriate for user $U_V$. In various embodiments, the translation qualification module 126 quantifies the value of the various possible candidate translations based on one or more of the following factors:

General translator competence: The translation selection module 127 determines how competent the translator ($U_T$) of a candidate translation is using, e.g., one or more of the various techniques used by the translation qualification module 126 when determining whether a particular translator $U_T$ is qualified. In one embodiment, translator competence is determined based on the translation ratings by other users of the prior translations of $U_T$.

Quality of the candidate translation: The translation selection module 127 determines how good the candidate translation appears to be by comparing the translation to other translations of the same text item, such as those submitted by other users, or machine translations. In one embodiment, candidate translations that appear particularly poor (e.g., have little textual similarity to the other translations, such as below some threshold percentage of words in common) are eliminated from consideration, regardless of the outcome of other factors.

Similarity of viewing and translating users: In one embodiment, the translation selection module 127 customizes the translation provided to the viewing user $U_V$ by evaluating the similarities between $U_V$ and the user $U_T$ that performed the translation. This potentially provides $U_V$ with a better translation by selecting a translator $U_T$ that is similar to $U_V$, and hence may be more likely to express himself in a manner most intuitive to $U_V$. In one embodiment, the evaluated similarities include similarities between the connections of $U_V$ and $U_T$ in the graph information store 120, such as whether $U_V$ and $U_T$ are first-order connections, and/or how many first-order connections $U_V$ and $U_T$ have in common. In one embodiment, the assessed similarities additionally and/or alternatively include demographic similarities as indicated by their respective user profiles, such as whether $U_V$ and $U_T$ have the same primary language (and, optionally, dialect of that language), a similar age, a similar location of birth or of residence, or the like. In one embodiment, the similarities are assessed based on a social graph affinity and affinity coefficients; this may involve one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and/or U.S. patent application Ser. No. 13/632,869, filed Oct. 1, 2012, each of which is incorporated by reference.

Process of Translation

Figure 2:
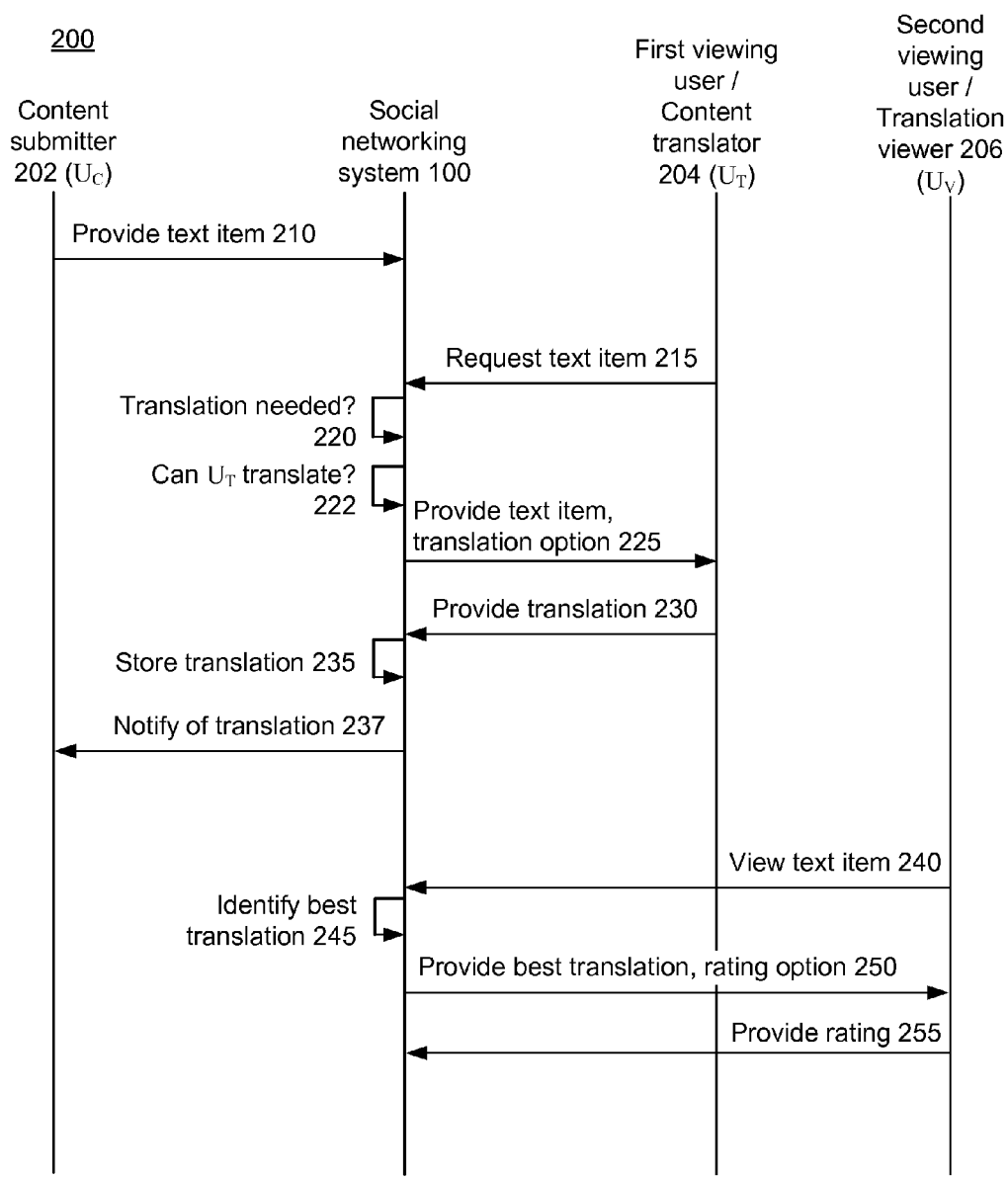
FIG. 2 illustrates the interactions between the social networking system of FIG. 1 and the various users involved in translating and viewing content, according to one embodiment.

FIG. 2 illustrates the interactions between the social networking system 100 and several different users when translating and viewing content using their respective client devices 130, according to one embodiment. More specifically, a content submitter 202 ($U_C$) provides content to the social networking system 100 in a first language; a content translator 204 ($U_T$) translates the content into a second, different language; and a translation viewer 206 ($U_V$) views—and, optionally, rates—the translated content.

In a first step, the content submitter 202 provides 210 a text item in a first language. The provided textual item may be, for example, all or part of a post, a status update, a check-in, a comment, a tag, an article or other document, a link, or any other type of content (including predominantly non-textual content, such as audio content, one or more images, or video content) including or associated with text. A first user viewing the text item (who in the example of FIG. 2 will subsequently act as the content translator 204), later requests to view 215 the text item provided by the content submitter 202 when it is presented by the social networking system 100, either implicitly or explicitly. For example, the text item may occur in a feed produced for the first viewing user 204 by the feed module 122.

For example, FIG. 3A illustrates an example user interface 300 generated by the feed module 122 of the social networking system 100 for the account of one of its users ("Cristoforo Re"), who speaks both English and Italian. The user interface 300 includes several posting text items provided by different content submitters 202 with whom the user has a connection on the social networking system 100. The first posting text item 305, for example, is by a celebrity (L. James) whose actions the user has elected to follow.

As shown in FIG. 2, in one embodiment, the social networking system 100 determines 220, for each posting (or other text item), whether a translation of the associated text is needed. In one embodiment, factors relevant to the determination include whether the text item will be of interest to a large percentage of users (e.g., whether the text was submitted by, or is associated with, someone with a very large number of connections on the social networking system 100, such as a celebrity), and/or whether the user associated with the text item has a significant percentage of first-order connections on the social networking system that speak a different language than the language of the text item. In other embodiments, a translation is considered always needed, and hence the determination 220 is not made. In one embodiment, this determination is made at the time that the text item is submitted to the social networking system 100, and step 220 uses the result of this earlier determination.

In one embodiment, the social networking system 100 determines 222 whether the first viewing user 204 is qualified to serve as a content translator 204 ($U_T$) for another language, as discussed above with respect to the translation qualification module 126. If so, the social networking system 100 provides 225 the first viewing user 204 with the option to provide a translation of the text item (as well as providing the text item 210 itself), such as by supplementing a user interface with a link, button, or other user interface element for that purpose. In a different embodiment, the translation option is always provided 225 (although the translation module 125 may not necessarily use the provided translations).

For example, referring again to FIG. 3A, the posting text item 305 includes an associated "Translate" link 307 that provides the option for the user ("Cristoforo Re") to translate the celebrity posting 305 from English into Italian. For example, the user "Cristoforo Re" may have Italian listed in his user profile on the social network system as a language that he speaks, and/or he may have provided prior translations from English into Italian that were determined to be trustworthy. In the example of FIG. 3A, the other postings do not include associated translation options because their associate content submitters 202 do not have a very large number of connections on the social networking system 100, although in other embodiments a translation option may be provided for any text item visible to a user.

As shown in FIG. 2, the user uses the translation option from step 225 to provide 230 a translation of the text item. For example, selecting the link 307 could display a text area in which the user types the translation. The social networking system 100 accordingly stores 235 the translation provided in step 230 in association with the original text item provided in step 210. Referring to the example of FIG. 3A, assume that the user ("Cristoforo Re"), acting as a content translator $U_T$ 204, provides the Italian translation "Ho preso i miei talenti di nuovo a Cleveland per unirmi con Zio Drew" for the original English text item "I've taken my talents back to Cleveland to join Uncle Drew."

In one embodiment, the translation module 125 of the social network system notifies 237 the content submitter 202 of the translation, such as by sending an email, a message within the social networking system 100, or other form of notification, and listing the original text item 210, the translation of the text item provided at step 230, and information about the content translator 204 (e.g., his or her name on the social networking system), among other information. The content submitter 202 then has the option to, for example, approve the translation, reject the translation, provide an alternate translation, specify that the text item should be routed for translation to particular users of the social networking system specified by the content submitter 202 (e.g., via particular user names or other identifiers, or via specified properties such as primary language, location of residence, or the like), or specify that the text item should be routed to a professional translator to obtain a translation. In one embodiment, unless the content submitter 202 approves the translation, it is removed from future consideration as a translation for the text item, such as by being removed from, or not being stored in, the translations 119B.

At a later point, a second viewing user 206 views 240 the text item that was provided at step 210 and translated at step 230. (For example, the text item may appear in a feed produced for the second viewing user 206 by the feed module 122.) The social networking system 100 identifies 245 the best translation for the second viewing user 206, as described above with respect to the translation selection module 127, and automatically provides 250 the best translation to the second viewing user.

In one embodiment, the translation module 125 provides attribution information corresponding to the content translator $U_T$ 204 along with the translation. In one embodiment, the content translator 204 can specify how much attribution information is provided, and of what type. For example, the content translator 204 could specify that no attribution information is to be provided; or that only his or her username is to be provided; or that his or her username is to be provided along with a link to his or her profile on the social networking system 100 (either the full profile, or a subset thereof that is relevant to translation, such as languages spoken, place of residence and of birth, age, and the like), for example.

In one embodiment, the social networking system 100 also provides an option to rate the translation, and the second viewing user 206 may use the option to provide 255 a rating for the translation. The translation qualification module 126 may then in future use the rating to assess the qualifications of the content translator $U_T$ 204 to provide translations.

Figure 3B:

For example, FIG. 3B illustrates a user interface 350 for a second viewing user 206, Marcello Scotti, who speaks Italian but not English (e.g., has listed Italian as his primary language in his profile on the social networking system 100), and who is a first-order connection of the user who provided the Italian translation of the English text item from FIG. 3A (namely, Cristoforo Re). Further, assume that Marcello Scotti (like Cristoforo Re) has elected to follow the celebrity L. James on the social networking system 100, and that the user interface 350 for Marcello Scotti should accordingly display the same recent text item 305 displayed in FIG. 3A, but in the language most appropriate for Marcello Scotti. Accordingly, the translation selection module 127 determines that Italian is the language in which the translation of the text item 305 is to be displayed and therefore determines whether Italian translations of the text item 305 are available.

In the example of FIG. 3B, the social networking system 100 has several Italian translations of the text item 305 and the translation selection module 127 selects the translation provided by Cristoforo Re (namely, "Ho preso i miei talenti di nuovo a Cleveland per unirmi con Zio Drew") and displays it in the user interface 350 for Marcello Scotti as posting text item 305. The translation selection module 127 may select this particular translation because, for example, Cristoforo Re is a first-order connection of Marcello Scotti, resides in the same region of Italy as Marcello Scotti, and has previously provided a number of translations from Italian to English that the social networking system 100 has deemed trustworthy. The user interface 350 also includes attribution information 308 for the translation listing the name of the content translator $U_T$ 204 (namely, the Italian phrase "Traduzione fornito da Cristoforo Re", which specifies the name of the translator.) Although only one translation for posting text item 305 is shown in the example of FIG. 3B, in some embodiments multiple translations may be displayed for a given text item, such as up to the top N (e.g., N=3) translations.

The example of FIG. 3B also depicts, next to an inquiry of whether the translation was good ("Buona traduzione?"), an option 309 to rate the translation—namely, thumbs-up/thumbs-down controls, respectively indicating whether the viewing user (Marcello Scotti) considers the translation to be of good quality. In other embodiments, the rating may be expressed in different manners and/or with different user interface components, such as a sliding scale specifying numbers 0 (worst) to 10 (best), or a flag indicating that the translation is flawed (such that if the viewing user does not set the flag, the translation is assumed to be good). In one embodiment, the original text is shown in association with the translation, or the option 309 includes the ability to show the original, so that the viewing user may evaluate in more detail whether the translation is of good quality.

OTHER CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A computer-implemented method comprising:
   storing a text item submitted on a social networking system by a publishing user of a plurality of users of the social networking system, the text item being in a first language;
   obtaining, from a plurality of translating users of the plurality of users of the social networking system, a plurality of translations of the text item into one or more second languages;
   identifying, from among the plurality of translations, a translation from the plurality of translations for display to a viewing user, the identification comprising evaluating one or more similarities between the viewing user and the translating users from whom the plurality of translations were obtained; and providing the identified translation for display to the viewing user.

2. The computer-implemented method of claim 1, wherein evaluating one or more similarities between the viewing user and the translating users comprises evaluating one or more similarities between connections of the viewing user and of the translating users on the social networking system.

3. The computer-implemented method of claim 1, wherein evaluating one or more similarities between the viewing user and the translating users comprises evaluating demographic similarities between the viewing user and the translating users.

4. The computer-implemented method of claim 1, wherein identifying the translation for the viewing user further comprises eliminating from consideration one or more translations of the plurality of translations based on comparisons of the one or more translations to other translations of the plurality of translations.

5. The computer-implemented method of claim 1, wherein identifying the translation for the viewing user further comprises:
    comparing one or more translations of the plurality of translations to automated machine translations of the text item into the one or more second languages; and
    eliminating from consideration one or more of the compared translations based on the comparisons.

6. The computer-implemented method of claim 1, further comprising:
    displaying, in visual association with the identified translation, attribution information identifying the translating user who submitted the identified translation.

7. A non-transitory computer-readable storage medium having computer-executable instructions comprising:
    instructions for storing a text item submitted on a social networking system by a publishing user of a plurality of users of the social networking system, the text item being in a first language;
    instructions for obtaining, from a plurality of translating users of the plurality of users of the social networking system, a plurality of translations of the text item into one or more second languages;
    instructions for identifying, from among the plurality of translations, a translation from the plurality of translations for display to a viewing user, the identification comprising evaluating one or more similarities between the viewing user and the translating users from whom the plurality of translations were obtained; and
    instructions for providing the identified translation for display to the viewing user.

8. The non-transitory computer-readable storage medium of claim 7, wherein evaluating one or more similarities between the viewing user and the translating users comprises evaluating one or more similarities between connections of the viewing user and of the translating users on the social networking system.

9. The non-transitory computer-readable storage medium of claim 7, wherein evaluating one or more similarities between the viewing user and the translating users comprises evaluating demographic similarities between the viewing user and the translating users.

10. The non-transitory computer-readable storage medium of claim 7, wherein identifying the translation for the viewing user further comprises:
    comparing one or more translations of the plurality of translations to automated machine translations of the text item into the one or more second languages; and
    eliminating from consideration one or more of the compared translations based on the comparison.

11. The non-transitory computer-readable storage medium of claim 7, the instructions further comprising:
    instructions for displaying, in visual association with the identified translation, attribution information identifying the translating user who submitted the identified translation.

12. A computer-implemented method comprising:
    storing a text item submitted to a social networking system by a first user, the text item being in a first language;
    comparing:
        prior translations for text items from the first language to a second language, the prior translations provided by a second user, and
        other translations of the text items from the first language to the second language, the other translations provided by users other than the second user;
    determining, based on the comparison, whether the second user is qualified to translate the text item to the second language;
    obtaining from the second user a translation of the text item into the second language; and
    storing the translation of the second user in association with the text item.

13. The computer-implemented method of claim 12, further comprising:
    determining that a third user speaks the second language; and
    providing the obtained translation of the text item to the third user.

14. The computer-implemented method of claim 12, further comprising computing automated machine translations of the text items, wherein determining whether the second user is qualified to translate the text item to the second language comprises comparing the prior translations provided by the second user for the text items with the automated machine translations.

15. The computer-implemented method of claim 12, further comprising receiving translations of the text items from other users, wherein determining whether the second user is qualified to translate the text item to the second language comprises comparing the prior translations provided by the second user for the text items with the translations by other users.

16. The computer-implemented method of claim 12, wherein determining whether the second user is qualified to translate the text item to the second language comprises:
    identifying ratings by other users of the prior translations by the second user; and
    determining whether the identified ratings are positive.

17. The computer-implemented method of claim 12, wherein determining whether the second user is qualified to translate the text item to the second language comprises determining a degree to which the prior translations provided by the second user contain terms on a term blacklist.

18. The computer-implemented method of claim 12, further comprising providing to the first user a notification that the translation has been obtained.

19. The computer-implemented method of claim 18, further comprising providing to the first user options to accept or to reject the translation.

20. A computer-implemented method comprising:
- storing a text item submitted on a social networking system by a publishing user of a plurality of users of the social networking system, the text item being in a first language;
- displaying, to each of a plurality of translating users, a webpage including: the text item and a plurality of other text items, and a user interface element allowing the second plurality of users to translate the text item;
- obtaining, from the plurality of translating users of the plurality of users of the social networking system, a plurality of translations of the text item into one or more second languages;
- identifying, from among the plurality of translations, a translation from the plurality of translations for display to a viewing user;
- determining a list of recent content items relevant to the viewing user, the relevant content items including the identified translation;
- placing the relevant content items within a webpage; and
- providing the webpage for display to the viewing user.

21. The computer-implemented method of claim 20, wherein the viewing user and the translating user who provided the identified translation are each represented as a node in a social graph and wherein providing the identified translation for display to the viewing user creates an edge between the nodes in the social graph.

* * * * *